United States Patent Office 2,693,248
Patented Nov. 2, 1954

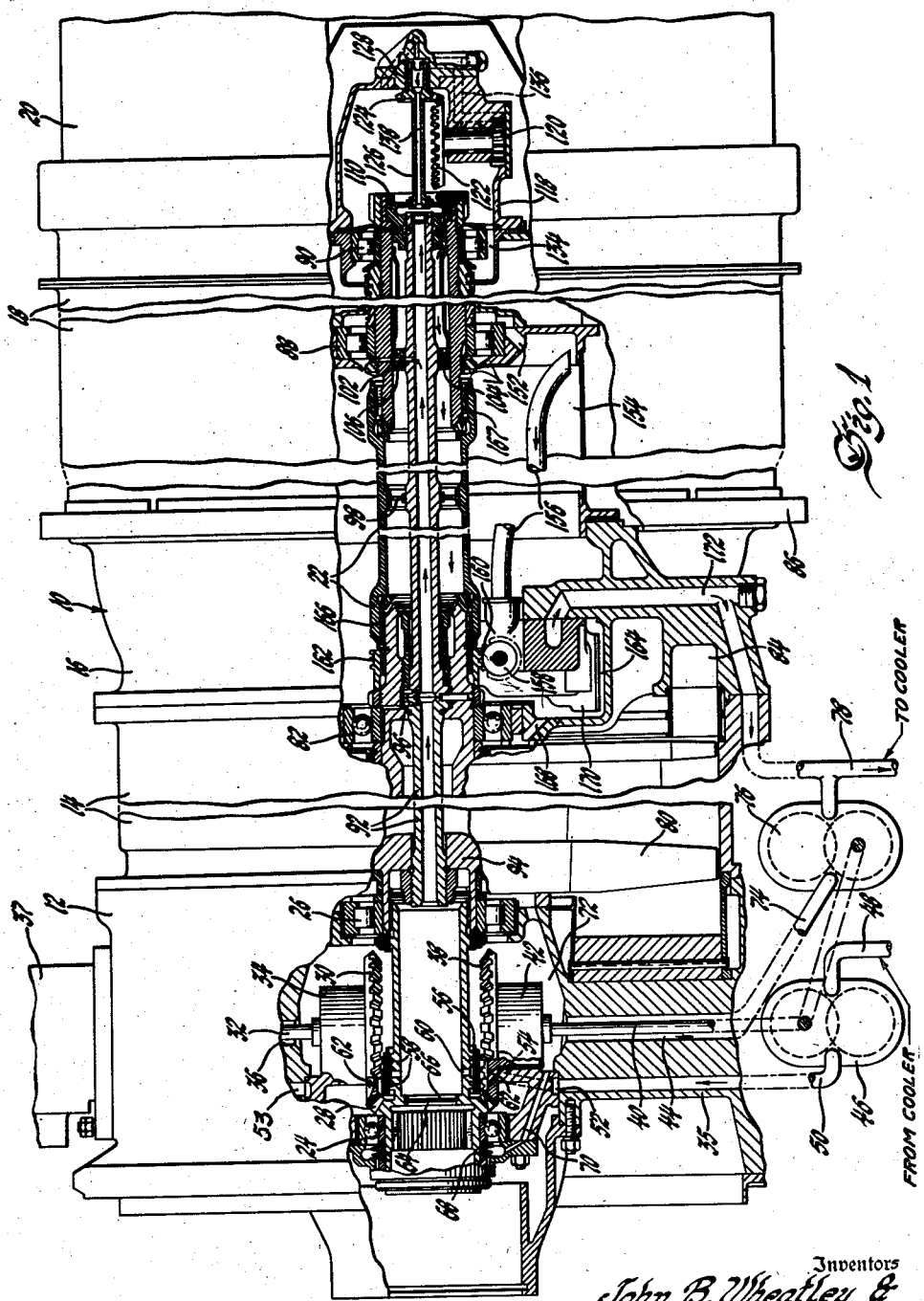

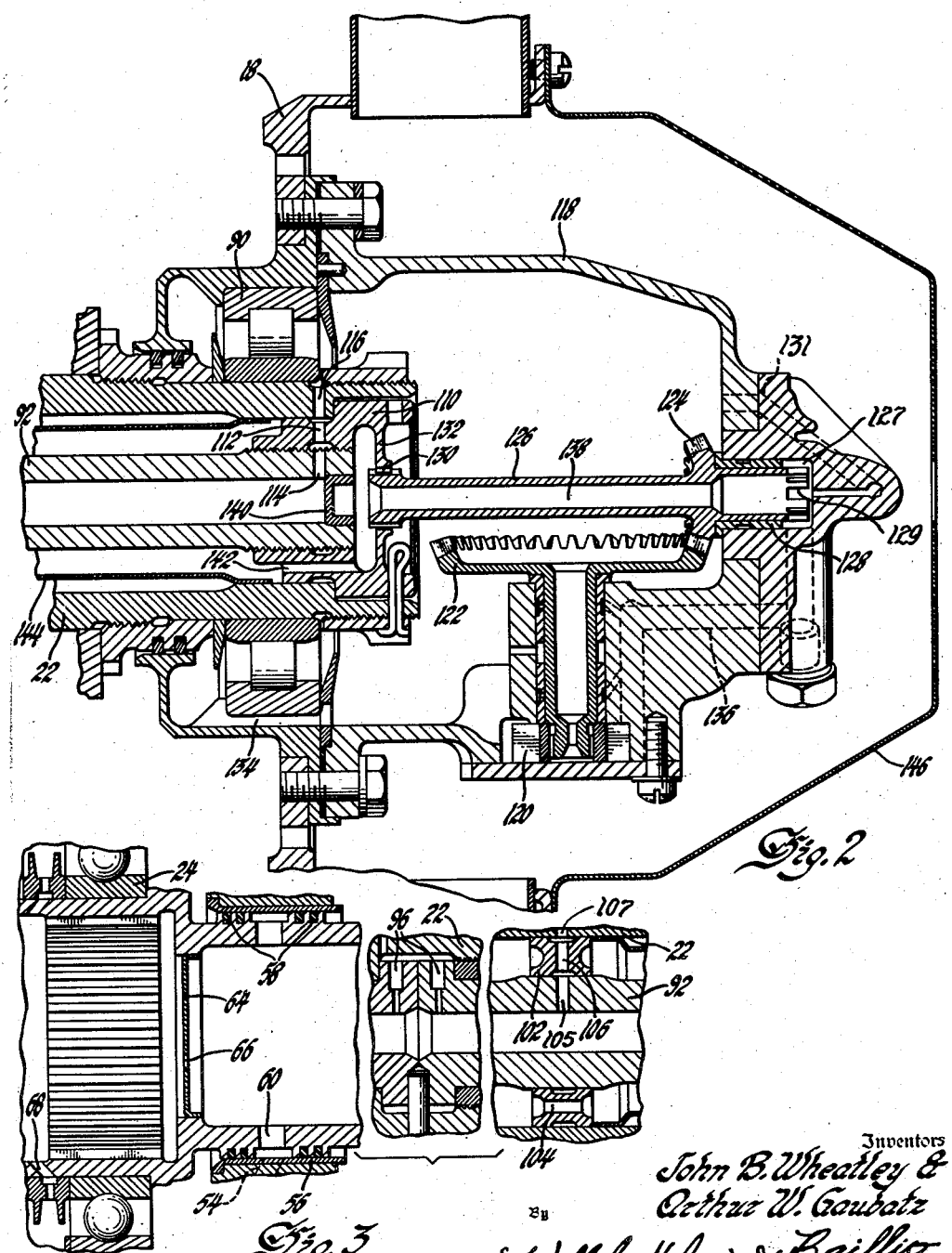

2,693,248

LUBRICATION SYSTEM

Arthur W. Gaubatz and John B. Wheatley, Indianapolis, Ind., assignors to General Motors Corporation, Detroit, Mich., a corporation of Delaware Application May 3, 1950, Serial No. 159,792

15 Claims. (Cl. 184—6)

This invention relates to power plants and more particularly to a lubrication system of a compressor turbine power plant.

The invention is illustrated on an axial flow compressor turbine plant. The power plant frame has five shaft bearings for the main shaft. A power take-off or accessory drive is located at the forward end of the power plant between the first two bearings to drive the oil pumps and other accessories. The first two bearings are lubricated by drainage oil or low pressure oil bleed from the accessory housing. The oil from the pump is conducted to a supply passage in the center of the main shaft. The supply passage extends the entire length of the shaft and has small branch passages to deliver oil to the third, fourth and fifth bearings. A coaxial sump is connected to the fifth or end bearing. A scavenge pump driven by the main shaft collects the oil which drains from the fifth bearing into the sump and delivers it to a concentric return passage in the shaft surrounding the lubricating oil supply passage. This return passage extends past the fourth bearing and oil passes out of the shaft adjacent the third and fourth bearing and into a sump. This sump has a main portion adjacent the third bearing and has an auxiliary sump portion extending to the fourth bearing. The sump portions are interconnected and an auxiliary pump transfers oil from the auxiliary sump and a main sump pump transfers oil from the third bearing or main sump to the oil cooler. Another scavenge pump returns the oil from the accessory drive to the oil cooler. The main oil pump then returns the oil to the passage in the main shaft.

The primary object of the invention is to provide in a power plant having a plurality of bearings supporting a main shaft at intervals, a lubricating oil supply system extending through the center of the shaft, a plurality of sumps to collect the oil from each bearing and a pumping system to return the oil to the supply point and to keep the sumps substantially dry.

Another object of the invention is to provide in a power plant having a main shaft supported by a plurality of bearings, a lubricating oil conduit and a return oil conduit extending through the shaft.

Another object of the invention is to provide in a power plant having a main shaft supported by a plurality of bearings, a sump at the bearings and an improved pump system for scavenging and returning oil to the oil cooler.

These and other objects of the invention are more fully described in the following specification and drawings showing a specific modification of the invention.

Figure 1 is a partial elevation view of the power plant with parts broken away and in section to show the lubricating system.

Figure 2 is an enlarged sectional view showing the end sump.

Figure 3 is a partial view of the main shaft showing the oil transfer details.

The invention is illustrated in connection with a power plant of the axial flow turbo propeller or jet type. The power plant is mounted in a main frame or housing 10 which has a forward or air inlet housing section 12, a compressor section 14, a compressor outlet section 16, a burner and turbine section 18 and a jet cone section 20. The main shaft 22 extends throughout the entire length of the machine from the air inlet housing 12 to the beginning of the tail cone section 20. In the air inlet housing the shaft 22 is supported by a first bearing 24 and a second or forward compressor bearing 26. Between these bearings a main power take-off gear 28 is fixed to the main shaft adjacent the first bearing 24. At the top of the main shaft 22 in Figure 1 the bevel gear 28 meshes with a bevel gear 30 to drive the shaft 32 which is rotatably mounted in the bearing 34 supported by a portion of the air inlet housing 12. Struts 35 of the air inlet housing provide a housing for the drive gear, bearings and oil passages. The shaft 32 extends upward through a passage 36 in the air inlet housing to drive suitable accessories located in the accessory housing 37 located thereon.

At the lower side of shaft 22 the bevel gear 28 meshes with a gear 38 connected to a shaft 40 mounted in the bearing 42 which is supported by the air inlet housing portion 12. The shaft 40 extends through a passage 44 in the air inlet housing 12 to drive the main lubricating oil pump 46. The main lubricating oil pump draws the oil from an oil cooler (not shown) through the conduit 48 and delivers the oil through the conduit or passage 50. The passage 50 connects with an annular passage 52. The passage 54 located in the air inlet housing portion 12 behind the gear 38 conducts the oil from the annular passage 52 to an annular gland 56 which is made in sections and is supported on the accessory housing portion 12 between the gears 30 and 38 and surrounds the shaft 22. The shaft 22 has a pair of spaced lands 58 engaging the gland 56. The space between the lands provides an annular oil transfer groove which is connected by aperture 60 to the interior cavity of the hollow shaft 22. Thus the oil from the pump 46 is supplied under pressure to the interior of the shaft 22.

Oil is also supplied to the accessories in housing 37 from pump 46, passage 50, annular transfer passage 52 and passage 53 which is connected in a conventional manner (not shown) to the accessory lubrication points such as the bearings. The oil draining from the accessories in the top portion 37 of the housing section 12 or oil bleed from the high pressure supply passage 53 for this purpose drains down the passage 36 and falls on top of the gear 30 where it is centrifugally thrown on the bearings 24 and 26. A plurality of apertures 62 are placed in the web of gear 38 to allow oil on the web of gear 38 to drop through and lubricate bearing 42. The holes 62 in gear 30 merely make gears 30 and 38 interchangeable. The wall 64 in the forward end of shaft 22, as best shown in Figure 3, has a small aperture 66 permitting oil to flow from the interior of shaft 22 through the aperture 66 in the wall 64 and through the aperture 68 in the shaft 22 to additionally lubricate the forward bearing 24. The oil from bearing 24 drains through the passage 70 to the sump portion 72 of the accessory housing 12. From the sump 72 the oil drains through the passage 44 surrounding the shaft 40 and through suitable conduits 74 to the drain or scavenger pump 76 which pumps the oil to the cooler (not shown) through conduit 78. The compressor housing section 14 has an axial flow compressor impeller 80 therein which is supported on the shaft 22 between the second bearing 26 and the third bearing 82. The shaft 22 then extends through the compressor outlet section 16 which has a compressed air outlet passage 84 leading to the fuel burner 86 which is supported in the burner and turbine housing section 18. In this section the main shaft 22 is supported by a fourth or front turbine bearing 88 and the fifth or rear turbine bearing 90 which supports the end of the main shaft 22. Between the second bearing 26 and the fifth or last bearing 90 the main shaft 22 has a coaxial lubricating oil passage conduit 92. The forward end of this conduit is sealed to the walls of the passage by the bulkhead 94. At the third bearing 82 the shaft 22 has an inner annular land contacting the outer side of conduit 92. A passage 96 extending through the land portion of shaft 22 and the conduit 92 conducts oil from the center of conduit 92 to the bearing 82. Between the bearings 82 and 88 the apertured annular bulkhead 98 in the main shaft 22 supports the lubricating oil conduit 92 but does not block the annular space. Adjacent the bearing 88 the bulkhead 102 supports the conduit 92 within the shaft 22. The annular bulkhead 102 shown in detail in Fig. 3 has axial passages 104 to allow flow through the concentric passage in the shaft for return oil and non-intersecting radial passages 106 which connects with a passage portion 105 extending through the conduit 92 to the bulkhead and a passage portion 107 extending through the shaft 22 to provide a passage from conduit 92 to the bearing 88 to lubricate the bearing 88.

The rear end of the shaft 22 has a bulkhead 110 secured therein to support the coaxial lubricating oil conduit 92. The bulkhead 110 has radial passages 112 which connect with radial passages 114 in the conduit 92 and radial passage 116 in the shaft 22 in order to conduct lubricating oil to the end bearing 90. An oil sump 118 is suitably secured to the turbine housing 18 around the bearing 90. A gear pump 120 is located in the base of the sump and is driven by bevel gear 122 meshed with bevel pinion 124 on pinion shaft 126. The pinion shaft 126 is supported in a bearing 128 at the rear of the sump 118 and coaxial with main shaft 22. The forward end of pinion shaft 126 is drivingly connected by splines 130 to the radial flange 132 secured to and displaced from the end of the bulkhead 110. The oil from bearing 90 drains out through the drain opening 134 to the sump 118 where it is pumped by pump 120 upward through the passage 136 in the wall of sump housing 118 to the bearing cavity behind the bearing 128. From this bearing cavity 127 the oil flows through the slots 129 in the end of the shaft 126 and around the end of the shaft and enters the hollow portion or conduit 138 in the pinion shaft 126. The passage 131 extending from the bearing cavity 127 to the housing or sump 118 provides an oil by-pass and air vent passage and lubricates the gears 122 and 124. A plug 140 in the end of conduit 92 diverts the oil between the flange 132 and the body portion of bulkhead 110 to the axial passages 142 in the bulkhead which returns the scavenged or drainage oil to the annular passage surrounding the lubricating oil conduit 92. This concentric oil passage has an additional concentric partition to provide an annular cooling air space between the partition 144 and the inner wall of the shaft 22. This feature is more fully described in the copending application of John B. Wheatley et al. Serial No. 162,068 filed May 15, 1950. The cooling air chamber 146 also surrounds the sump 118 and this structure is more fully described and claimed in the copending application of John B. Wheatley Serial No. 142,425 filed February 4, 1950.

The oil supplied by passage 106 to bearing 88 passes through the drain 152 to the auxiliary sump 154 which is a cylindrical portion of the housing concentrically mounted with respect to the main shaft 22. A suction pipe 156 draws the oil from the base of the sump 154 to the pump 158 driven by the gear 160 which meshes with the worm 162 on the main shaft 22. This pump discharges the oil into outlet passage 172 located adjacent the bearing 82. The return oil flowing in the annular passage between the conduit 92 and the shaft 22 passes through the outlet passage and spline passage portion 166 adjacent the bearing 82 to fall in the main sump 164 and through a similar outlet passage and spline 167 to fall in the auxiliary sump 154. The excess oil from bearing 82 also passes through drain 168 into the main sump 164 which is annular and concentric with the shaft and in fluid communication with auxiliary sump 154. From the sump 164 a sump pump 170 driven by the gears 160 and 162 pumps the oil out through the conduit 172 to the outlet 78 which delivers the oil to the oil cooler.

In this turbo propeller power plant the main shaft is supported by the first or accessory drive bearing 24, a second or forward compressor bearing 26, a third or rear compressor bearing 82, a fourth or forward turbine bearing 88 and a fifth or rear turbine bearing 90. The main oil pump 46 is driven from the power take-off gears 38 and 28 located adjacent the accessory drive bearing 24. This pump draws oil from an oil cooler and delivers it via a transfer gland 56 to the interior of the hollow main shaft 22. There the oil travels rearwardly and at the forward compressor bearing 26 enters a lubricating oil conduit 92 mounted concentrically in the shaft 22. At the rear compressor bearing 82 passage means 96 are formed in the conduit 92 and shaft 22 to conduct oil to this bearing. At the forward turbine bearing 88 a radial passage 106 extends through the oil conduit 92 and supporting bulkhead 102 and the main shaft 22 to supply oil to the forward turbine bearing. A radial oil supply passage, which is best illustrated in Figure 2, consists of a passage portion 114 in the conduit 92, a portion 112 in the bulkhead 110, and a portion 116 in the shaft 22 and supplies oil to the rear bearing 90. The excess oil from this bearing passes through the drain 134 to the bottom of sump chamber 118. An oil pump 120 draws the oil from the bottom of the sump 118 and delivers it via passage 136 to the hollow passage 138 in the pump pinion drive shaft 126. This hollow shaft is splined at 130 in driving relation to the bulkhead 110 which is attached to shaft 22. The bulkhead 110 has a flange 132 which provides a passage for the return of scavenged oil. A plug 140 blocks the end of the oil conduit 92 and thus the oil passes through the axial passages 142 in the bulkhead 110. The passages 142 pass between the passages 112 in the bulkhead 110. The return oil thus flows in the annular space between the conduit 92 and the shaft to shield the oil supply in conduit 92 from the high heat of the turbine and thus keep the oil supply cool.

The oil from bearing 88 passes through drain 152 to the fourth bearing or auxiliary cylindrical sump 154. The sump 154 is scavenged by a suction conduit 156 connected to pump 158 in sump 164 which is driven from the main shaft by the worm 162. The pump 158 delivers the oil to passage 172. In addition the return oil from sump 118 which is pumped through the concentric return passage and shaft 22 falls through the outlet passages 166 and 167 in the shaft 22 to the main sump 164 and the auxiliary portion 154 respectively and oil from bearing 82 drains through drain passage 168 to the sump 164. The oil in sump 164 is removed by sump pump 170 driven from worm 162 and is pumped out of the housing through passage 172 to join with the outlet 78 from the scavenger pump 76. Then the oil passes to a cooler and returns to the main oil pump 46.

The forward bearing supporting the shaft 22 adjacent the accessory drive and the forward end of the compressor are lubricated by oil which is concentrically thrown off by the power take-off gears 30 and 38. The return oil from accessories or oil bleed through a reducing valve in the upper portion of the machine drains down the passage 36 and drops on the gear 30. A portion of this oil is slung to engage the bearings 24 and 26. Holes 62 are provided in gear 38 to allow the oil to lubricate bearing 42. The oil drains from both of these bearings to the sump 72 and then via the passages 44 and 74 to the scavenger pump 76.

This lubricating system provides a simplified high pressure lubrication system for the rear bearings and a dry sump return for the oil. This is important since not only the weight of the oil but the forces created in the oil by the high speed operation of craft employing these power plants create additional hazards. Thus the branch oil from each of the bearings is continuously being pumped and returned to maintain each of these sumps in a substantially dry condition. The main shaft is divided into two concentric passages to provide a portion of the conduit for the lubricating oil and the return of the scavenged oil.

The above power plant is illustrative of the invention. It will be appreciated that many modifications may be made within the scope of the depending claims.

We claim:

1. In a shaft assembly, a frame, a bearing supported on said frame, a shaft in said bearing, a sump surrounding said bearing and the end of said shaft, a pump in said sump, a pair of passages in said shaft, one of said passages being connected to the bearing, a pinion shaft coaxially connected to said shaft, a conduit in said pinion shaft connected to another of said passages, a bearing cavity in a wall of said sump, said pinion shaft extending into said bearing cavity, means drivingly connecting said pinion shaft to said pump, and a passage connecting the pump to said bearing cavity and pinion shaft conduit.

2. In a shaft assembly, a frame, a bearing supported on said frame, a shaft in said bearing, a sump surrounding said bearing and the end of said shaft, a pump in said sump, a conduit mounted in said shaft to provide a passage and a concentric passage, one of said passages being connected to the bearing, a pinion shaft coaxially connected to said shaft, a conduit in said pinion shaft connected to another of said passages, a bearing cavity in a wall of said sump, said pinion shaft extending into said bearing cavity, means drivingly connecting said pinion shaft to said pump, and a passage connecting the pump to said bearing cavity and conduit in said pinion shaft.

3. In a shaft assembly, a stationary housing, a plurality of bearings in said housing, a shaft rotatably supported in said bearings, an oil supply conduit in said shaft, means to supply oil to said conduit, means to supply oil to said bearings from said conduit, a return passage in said shaft, a stationary sump surrounding one of said bearings, a pump in said sump, means to conduct oil from said pump to said return oil passage, and means to transfer oil from said return oil passage to said means to supply oil to said supply conduit.

4. In a shaft assembly, a housing, a plurality of bearings in said housing, a shaft rotatably supported in said bearings, an oil supply conduit in said shaft, means to supply oil to said conduit, means to supply oil to said bearings from said conduit, a return oil passage in said shaft, a sump surrounding one of said bearings, a pump in said sump, means to conduct oil from said pump to said return oil passage, a second sump for collecting oil from another bearing, a third sump, an outlet passage connected to said supply means, a pump to transfer oil from the second sump to said outlet passage, means to transfer oil from said return oil passage to said third sump, and a pump to return the oil from said third sump to said outlet passage.

5. In a shaft assembly, a housing, a plurality of bearings in said housing, a shaft rotatably supported in said bearings, an oil supply conduit in said shaft, means to supply oil to said bearings from said conduit, a return oil passage in said shaft, a sump surrounding one of said bearings, a pump in said sump, means to conduct oil from said pump to said return oil passage, a second sump for collecting oil from another bearing, a third sump in fluid communication with said second sump, an outlet passage, a pump to transfer oil from the second sump to said outlet passage, means to transfer oil from said return oil passage to said third sump, and a pump to transfer oil from said third sump to said outlet passage.

6. In a shaft assembly, a frame, a vertical bearing in said frame, a shaft rotatably mounted in said bearing, a gear horizontally mounted on said shaft above said bearing, said gear having a web having a cavity in the upper surface to collect oil, means to supply oil to said cavity, and an aperture in said web connecting said cavity at the top surface of said gear to a point on the bottom surface of said gear above said bearing to conduct oil to said bearing.

7. In a shaft assembly, a frame having a sump, a vertical bearing in said frame above said sump, a vertical bore extending from the base of said sump in said frame, a shaft rotatably mounted in said bearing, said shaft having a smaller diameter than said bore and extending into said bore, a gear horizontally mounted on said shaft above said bearing, said gear having a web having an upper surface to collect oil, additional bearings mounted in the plane of said upper surface of said gear, means to supply oil to said upper surface, said gear during rotation throwing oil by centrigugal force to said additional bearings, and the excess oil draining to said sump and then to said bore.

8. In a shaft assembly, a frame, a plurality of bearings mounted in said frame, a shaft rotatably mounted in said frame, a lubricating supply passage within said shaft, means to supply lubricating oil to said supply passage, a return passage within said shaft surrounding said supply passage, conduit means to conduct lubricating oil from said supply passage through said return passage and said shaft to said bearings, means to collect lubricating oil from some of said bearings and deliver it to one part of said return passage, and means to conduct oil from another part of said return passage.

9. In a shaft assembly, a housing, a plurality of bearings in said housing, a shaft rotatably supported in said bearings, an oil supply conduit in said shaft, means to supply oil to said bearings directly from said supply conduit, a return oil passage in said shaft, a sump surrounding one of said bearings lubricated directly by said means to supply oil, a pump in said sump, means to conduct oil from said pump to said return oil passage, another sump surrounding another bearing, lubricated by said means to supply oil, and means to transfer oil from said return oil passage to said another sump.

10. In a shaft assembly, a housing, a plurality of bearings in said housing, a shaft rotatably supported in said bearings, an oil supply conduit in said shaft, means to supply oil to said bearings from said conduit, a return oil passage surrounding said conduit in said shaft, a sump surrounding one of said bearings and enclosing the end of said shaft, a pump in said sump, means to conduct oil from said pump to said return oil passage, a second sump for collecting oil from another bearing, an outlet conduit, a pump to transfer oil from the second sump to said outlet conduit, and means to transfer oil from said return oil passage to said second sump.

11. In a shaft assembly, a housing, a plurality of bearings in said housing, a shaft rotatably supported in said bearings, an oil supply conduit in said shaft, means driven by said shaft to supply oil to said conduit, means to supply oil to said bearings from said conduit, a return oil passage in said shaft surrounding said oil supply conduit to keep the oil supplied cool, a sump surrounding one of said bearings, a pump driven by said shaft in said sump, means to conduct oil from said pump to said return oil passage, a second sump for collecting oil from another bearing, an outlet passage, a pump driven by said shaft to transfer oil from the second sump to said outlet passage, means to transfer oil from said return oil passage to said second sump, and means connecting said outlet passage to said supply means.

12. In a shaft assembly, a housing, a plurality of bearings in said housing, a shaft rotatably supported in said bearings, an oil supply conduit in said shaft, means to supply oil to said bearings from said conduit, a return oil passage surrounding said conduit in said shaft, a sump surrounding one of said bearings and enclosing the end of said shaft, a pump in said sump, means to conduct oil from said pump to said return oil passage, a second sump for collecting oil from another bearing, a third sump for collecting oil from another bearing, an outlet conduit, a pump means to transfer oil from the second and third sumps to said outlet conduit, and means to transfer oil from said return oil passage to said second and third sumps.

13. In a shaft assembly, a housing, a plurality of bearings in said housing, a shaft rotatably supported in said bearings, an oil supply conduit in said shaft, means driven by said shaft to supply oil to said conduit, means to supply oil to said bearings from said conduit, a return oil passage in said shaft surrounding said oil supply conduit to keep the oil supplied cool, a sump surrounding one of said bearings, a pump driven by said shaft in said sump, means to conduct oil from said pump to said return oil passage, a second sump for collecting oil from another bearing, an outlet passage, a pump driven by said shaft to transfer oil from the second sump to said outlet passage, and means to transfer oil from said return oil passage to said second sump.

14. In a shaft assembly, a frame, a bearing supported on said frame, a hollow shaft in said bearing, a sump surrounding said bearing and enclosing the end of said shaft, a pump in said sump and drawing therefrom, a tube mounted within said shaft to provide a first passage within the tube and a second passage between the tube and shaft, means defining a third passage providing a pressure connection from the first passage to the bearing, means providing a drainage path from said bearing into said sump, means defining a fourth passage connecting the discharge from the pump into the second passage, and means drivingly connecting said shaft to said pump.

15. In a shaft assembly having a plurality of bearings in a high temperature zone, a main shaft in said bearings, means to supply oil to said bearings including a conduit through a portion of said shaft to supply oil directly to some of said bearings, means to return the oil from some of said bearings including a conduit within said shaft surrounding a portion of said supply conduit in said shaft in the high temperature zone to keep said supply conduit cool, and a conduit extending across the second-recited conduit from the first-recited conduit to at least one of said bearings in the high temperature zone to conduct oil thereto.

References Cited in the file of this patent

UNITED STATES PATENTS

| Number | Name | Date |
| --- | --- | --- |
| 1,404,538 | Mitchell | Jan. 24, 1922 |
| 1,470,769 | Shaw | Oct. 16, 1923 |
| 1,485,537 | Vincent | Mar. 4, 1924 |
| 1,608,413 | Mortensen | Nov. 23, 1926 |
| 1,891,726 | Radford | Dec. 20, 1932 |
| 2,155,218 | Cain | Apr. 18, 1939 |

(Other references on following page)

UNITED STATES PATENTS

| Number | Name | Date |
|---|---|---|
| 2,164,294 | Mahan | June 27, 1939 |
| 2,225,136 | Taylor | Dec. 17, 1940 |
| 2,362,644 | Lemmon | Nov. 14, 1944 |
| 2,402,467 | Thompson | June 18, 1946 |
| 2,457,999 | Hulbert | Jan. 4, 1949 |

FOREIGN PATENTS

| Number | Country | Date |
|---|---|---|
| 352,753 | Great Britain | July 16, 1931 |
| 712,495 | France | July 21, 1931 |